Oct. 27, 1959 W. A. WILLIAMS 2,909,937
CHAIN LUBRICATOR AND DUST GUARD
Filed Sept. 3, 1957 2 Sheets-Sheet 1
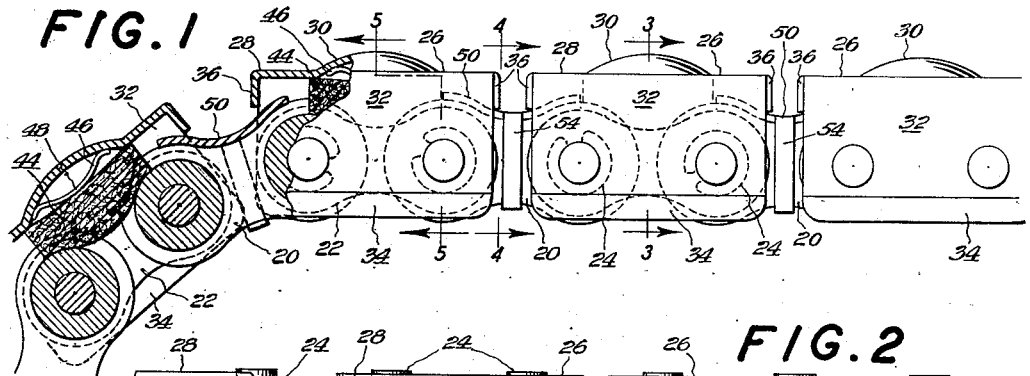
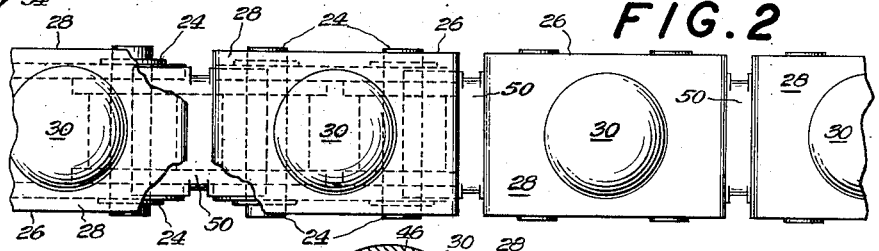
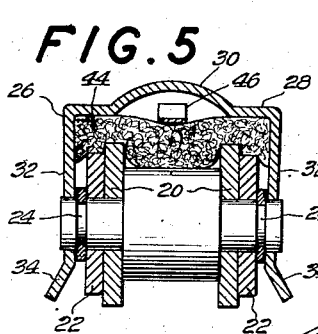
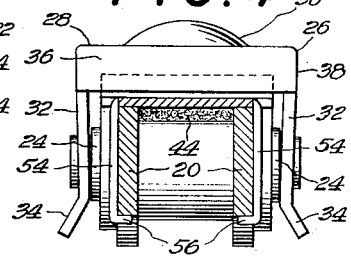
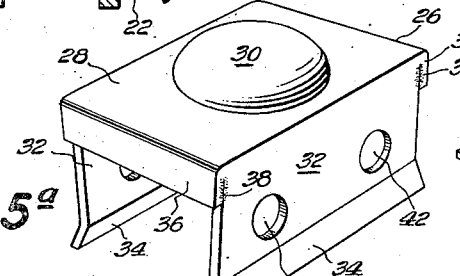
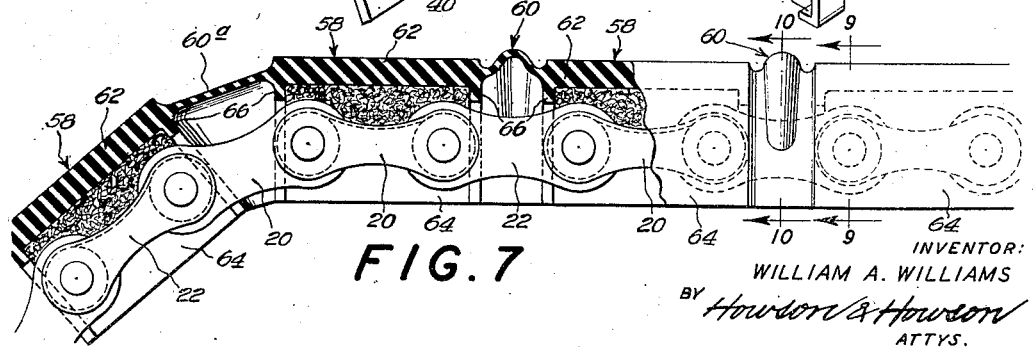
INVENTOR:
WILLIAM A. WILLIAMS
BY Howson & Howson
ATTYS.

Oct. 27, 1959        W. A. WILLIAMS        2,909,937
CHAIN LUBRICATOR AND DUST GUARD
Filed Sept. 3, 1957        2 Sheets-Sheet 2

INVENTOR:
WILLIAM A. WILLIAMS
BY Howson & Howson
ATTYS.

United States Patent Office 2,909,937
Patented Oct. 27, 1959

2,909,937

CHAIN LUBRICATOR AND DUST GUARD

William A. Williams, Philadelphia, Pa.

Application September 3, 1957, Serial No. 681,751

10 Claims. (Cl. 74—230)

The present invention relates broadly to power-transmission chains and more specifically to chain drives applicable to various types of machines such as in industrial plants. In the application of chain drives to various machines such as in industrial plants, a problem arises of keeping the chain lubricated and protected from dust. The present invention is primarily directed to a solution of this problem.

While in the following description of embodiments of the invention, and in the drawings, reference is made to roller types of chains, it is to be understood that the present invention is applicable to all types of power-transmission chains including such as block, roller and inverted-tooth or so-called silent chain.

Attempts have heretofore been made to solve the problem of maintaining chains lubricated and protected from dust to insure long life of the chain and proper operation thereof. One of the best solutions of this problem is to install a metal guard completely around the main drive, and additionally provide suitable seals at the points where the shafts project into the casing. To obtain the optimum results, such cases must be tightly fitted so as to not only retain oil but also prevent the entrance of dust onto the chains. As can well be understood, such cases and their application are very expensive and usually would be more costly than the initial cost of the chain drive itself.

A less effective but also less costly mechanism would be a casing in the nature of a simple metal guard around the drive, having no seals at the shafts, and a poor fit between the two halves of the casing. This type of casing will retain a pool of oil and if a drip lubricator is provided, a chain can be kept reasonably well lubricated and most of the dust in the atmosphere is kept away from the chain.

In actual industrial practice, however, the majority of chain drives are installed and operated in the absence of any type or kind of guard, since the guards normally must be custom made for each application and users of the chain drives do not desire to stand the expense or trouble of installing such guards. Where no guards are utilized, the chains get oils superficially applied at irregular intervals and in such circumstances if the chain is operated at high speeds the oil is thrown off due to movement and centrifugal force in a very short period of time.

With the foregoing in mind, the present invention is directed primarily to provide a satisfactory chain drive dust guard and lubricator which gives satisfactory results and at the same time maintains the cost of the guard and lubricator to not more than half the initial cost of the chain itself. Use of the lubricator and guard of the present invention will double or triple the life of the chain and, in view of low initial cost and ease of application, will be a good investment.

Another object of the present invention is to provide a chain lubricator and dust guard for chain drive applications which will prevent dust and dirt from entering that side of the chain not contacting the sprocket, and of more importance will maintain a supply of oil constantly in contact with the points on the chain that will receive the oil, and permit it by capillary action to reach the interior bearing surfaces. It has been found that the present lubricator greatly increases life of chains and the sprockets on which the chains are entrained.

Another object of the present invention is to provide a dust guard and lubricator for chain drives which is substantially continuous as applied to the sides of the chain, and the back surface thereof not in contact with the sprockets associated with the drive, to afford ample protection from dust and sufficient lubrication to the chain.

It is a further object of the present invention to provide a plurality of types of guards and lubricators of the nature described, the purpose and result of each being to cover as much of the chain as possible, and retain lubricant against the action of centrifugal force and gravity resulting from operation of the chain, and to make the lubricant available to the chain by contact with felt supersaturated with oil so that when centrifugal forces are not acting, oil can reach the interior of the chain.

Other objects and advantages of the present invention will be more readily apparent from the following detailed description of embodiments thereof when taken together with the accompanying drawings in which:

Fig. 1 is a fragmentary elevational view, parts being broken away and partially in section for clarity, showing application of one form of the present invention;

Fig. 2 is a top plan view of the device shown in Fig. 1;

Fig. 3 is a sectional view taken on line 3—3 of Fig. 1;

Fig. 4 is a sectional view taken on line 4—4 of Fig. 1;

Fig. 5 is a sectional view taken on line 5—5 of Fig. 1;

Fig. 5a is a perspective view of a cap constituting one form of guard applicable to the pin link of a roller chain;

Fig. 6 is a perspective view of a shield member adapted for use in conjunction with the cap of Fig. 5a to provide a substantially continuous guard for the chain;

Fig. 7 is an elevational view, parts thereof being broken away and parts in section showing a second embodiment of the invention;

Figure 8:
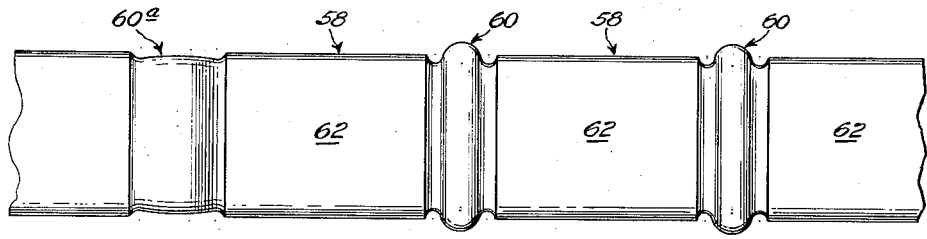
Fig. 8 is a top plan view of the embodiment of Fig. 7.
Figure 9:
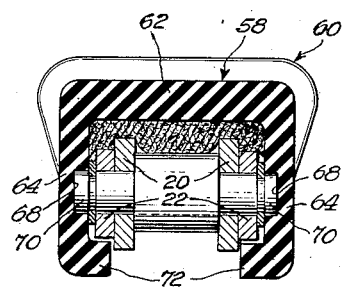
Fig. 9 is a sectional view taken on line 9—9 of Fig. 7.
Figure 10:
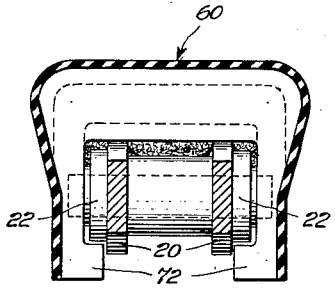
Fig. 10 is a sectional view taken on line 10—10 of Fig. 7.

In the various embodiments of the invention disclosed in the drawings and as hereinafter described, for simplicity in providing an understanding of the invention, the dust guards and lubricators are shown as applied to roller type power-transmission chains. Manifestly the construction can be applied to any type of power-transmission chain as will be readily understood.

The embodiment of the invention shown in Figs. 1 to 6 of the drawings is applied to the known type of roller chain including a plurality of roller links 20 interconnected by pin links 22, and utilizing snap washers 24 for securing the various links together to form the continuous chain run. This is a standard construction as well known in the art and need not be described further in detail herein, since it does not form a part of the invention.

The dust guard and lubricator device of the present invention, in this form of the invention, includes an all metal cap 26 having a top surface 28 of substantially planar configuration, with a dome shaped bulge formed therein and extending outwardly. This bulge, in conjunction with the remainder of the structure, constitutes an oil reservoir operable under certain conditions to retain oil forced outwardly from the chain by centrifugal force as a chain goes over a small sprocket at high speed for example. Additionally, the cap has transverse depending sides 32, the bottom portions thereof being flared outwardly at 34. The longitudinal ends of the cap also have depending side members 36 which are soldered at 38 to the edges of the depending sides 32. This construction forms a leak-proof oil cup in the upper portion of the cap from the lowermost end of the sides 36 upwardly.

The depending sides 32 are provided with spaced holes 40 and 42. These holes 40 and 42 are so positioned in depending sides 32 and of a size whereby the cap can be placed over the pin links 22 in the chain and by co-acting with the pins, clamp the cap onto the pin link of the roller chain. In use, a piece of felt 44 is contained within the cap and bears against outer surfaces of the links. To maintain this contact with the surfaces of the chain links, a strip spring 46 having a central depending portion 48 is placed within the confines of the bulge 30, to press the felt outwardly into link contacting arrangement and it also facilitates the felt assuming the proper configuration to match that of the link portions.

Before assembly, of the caps 26 on the links, the felt inserts 44 are saturated or supersaturated with oil and due to the configuration and size of the cap, the felt is surrounded and the cup having considerable larger volume than the felt keeps the felt supersaturated. The cap is so designed that under the action of centrifugal force, as a chain goes over a small sprocket at high speed, the oil in the chain and the oil in the felt will be retained by the cup. When the chain reaches a straight portion of the drive and particularly in an upper run of the chain, the oil can go back into the felt and back into the chain.

In the described embodiment, the dust guard will prevent dust from entering the side of the chain which is removed from sprocket contact and will serve to keep a supply of oil constantly in contact with the points on the chain that will receive the oil and permit it by capillary action to reach the interior bearing surfaces. The actual contact is clearly shown in Figs. 3, 4 and 5.

As previously pointed out in this application, it is preferable to have substantially continuous configuration or arrangement of the dust guard and additionally means to prevent loss of oil due to centrifugal action. The caps 26 apply only over the pin links of the chain. In order to increase the effectiveness of the invention, an additional shield can be placed between the caps 26, and which would be arranged over the roller link. This shield 50 is shown in perspective in Fig. 6 of the drawings and includes a curvilinear top surface 52 of a shape to conform with the shape or surface of the roller link. Depending legs 54 with inturned lower ends 56 are adapted to pass over the outer transverse surfaces of the roller link and secure the shield in position.

As shown in Figs. 1 and 2 of the drawings, the longitudinal ends of the top surface 52 extend under and beyond the longitudinal end sides 36 of cap 26. Because of this arrangement, as the chain bends around a sprocket into the position shown in the left-hand side of Fig. 1, the entire upper surface of the chain will be covered and yet the construction does not prevent proper operation and functioning of the chain. This additional shield which has been added between the caps will tend to collect oil which otherwise would fly off the parts of the roller link not protected by the cap when the chain is going over the small sprocket. The oil drops leaving the roller link, by centrifugal force, impinge upon the shield and are then carried back to the felt, thence to be recirculated back to the chain. When using the cap alone it has been found that after a few days of operation at high speed, the oil is gradually used up from the felt and that it escapes between the caps. With the additional shields however, this has to a large extent been eliminated.

Figs. 7 to 11 inclusive, show a second embodiment of the invention which provides the same or improved end results, and in which a slightly different configuration and structure is utilized. Again the roller chain consists of roller links 20 and pin links 22, interconnected in the usual manner. The dust guard and cover in this embodiment is continuous over the length of the chain and includes sections 58 covering the pin links, and intermediate portions 60 covering those portions of the roller links 20 not covered by the sections 58. The sections 58 consists of heavy or thick rubber, including tops 62, depending transverse sides 64, and depending longitudinal end portions 66. The portions 62, 64 and 66 combine to form a cap in a manner similar to the cap member 26 of the preceding embodiment. It will be noted from Fig. 9 of the drawings that recesses 68 are provided on the interior of the sides 64 which fit over the ends of the pins 70, which in conjunction with inturned ends 72 fasten the cover on the chain in an obvious manner.

Figure 11:
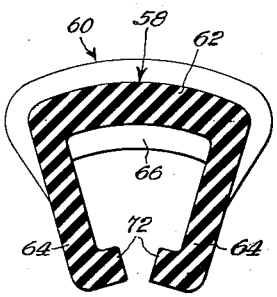
Fig. 11 is a sectional view of the guard shown in Fig. 9 before application to the chains.

Intermediate these thick sections 58 covering the pin links, the guard over the roller link is considerably thinner and flexible to compensate for the increase and decrease in the distance between the points on the chain at is goes over and leaves a sprocket. During a normal straight run this section 60 assumes a partial tubular or bulging configuration or corrugation whereas, when the chain is passing over a sprocket for example, it is stretched out into a substantially flat configuration as indicated at 60a in the left-hand portion of Fig. 7. Pieces of felt are confined within the boundaries determined by the top 62, sides 64 and 66 in a manner similar to the caps 26 in Fig. 1. While the felt could be continuous, it has been found that, in operation, more satisfactory results are obtained by having discontinuous felt sections since otherwise the oil would drain from high points on the drive to the low points when the machine was shut down for a day or two. This could cause a substantial loss of the oil. This is prevented when the felt is not continuous. The shape of the covering utilized in this embodiment, prior to installing on the chain, is shown in Fig. 11 and it will be noted that this configuration, due to the resiliency of the material utilized, preferably rubber, will tend to more firmly grasp the chain elements.

Figure 12:
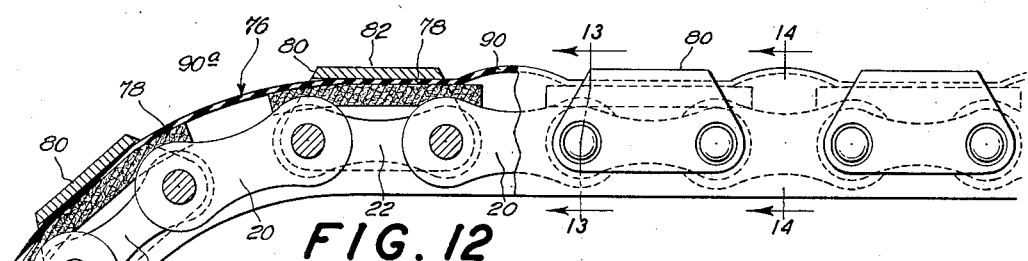
Fig. 12 is an elevational view, parts being broken away and parts in section disclosing a further embodiment of the invention.
Figure 13:
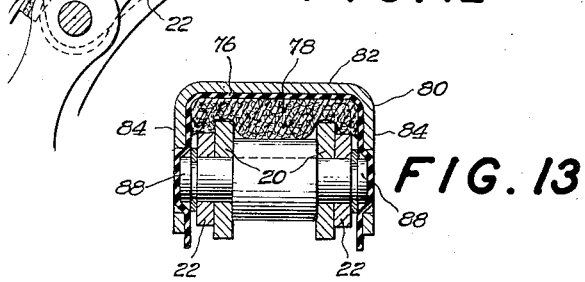
Fig. 13 is a sectional view taken on line 13—13 of Fig. 12.
Figure 14:
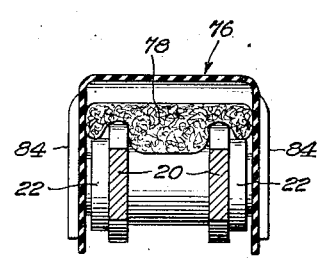
Fig. 14 is a sectional view taken on line 14—14 of Fig. 12.
Figure 15:
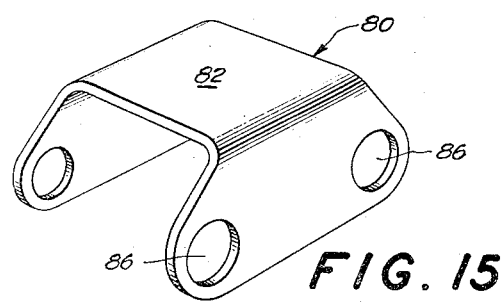
Fig. 15 is a perspective view of a cap utilized in the embodiment of Fig. 12.

A further embodiment of the invention is depicted in Figs. 12 to 14, wherein the chain again consists of roller links 20 and pin links 22 interconnected in the usual manner. In this embodiment however, a substantially channel shaped thin rubber casing 76 of a continuous nature surrounds the top and lateral sides of the chains or chain portions. Felt pieces 78 are held in position over the pin links 22 and portions of the roller links 20 as shown in Figs. 12, 13 and 14. The necessary clamping action is accomplished by means of metal clips 80 having top portions 82 and depending sides 84 with holes 86 therein which fit over the ends of pins 88 to secure the various portions in assembled relationship. This relatively thin U-shaped or channel shaped casing 76 will assume a slightly bulged configuration, as shown at 88, over the roller link portions during straight runs of the chain but will stretch out into a curvilinear continuity where the chain passes over the sprocket as indicated at 88a.

Manifestly different materials can be utilized both in the felt and in the coverings which have been described as rubber, such as natural or synthetic, and plastics. Three basically similar and yet slightly different methods of accomplishing the desired end result have been described hereinabove, and each of the embodiments covers as much as possible of the chain and retains lubricant against the action of centrifugal force and gravity, and makes lubricant available to the chain by contact with supersaturated felt so that when centrifugal forces are not acting, the oil can reach the interior of the chain. On very short, high speed chains, the oil may not be able to get back into the chain as well as desired until the machine is stopped. This, however, still is better than no protection at all, since seldom do operators relubricate chain drives each time a machine is stopped.

The guard can be installed at tthe chain factory and the chain sold in continuous lengths. Distributors can remove a cap, or a clip, or a shield, as required, part the chain in the usual fashion, reassemble the chain and by using a piece of appropriate material on the rubber versions, obtain a continuous leak-proof guard. Manifestly minor changes in details of construction will be apparent to those skilled in the art, without departing from the spirit and the scope of the invention as defined in the appended claims.

I claim:

1. A dust guard for power transmission chains having a plurality of interconnected links comprising a cap shaped member adapted for mounting on a said link and movable therewith, said member presenting a partial link surrounding cup shaped cavity to one side of said link with the other side of said link exposed, means resiliently securing said cup shaped cap member to a link in link surrounding position, and link lubricant applying means mounted in said cavity and maintained in direct lubricating contact with said link.

2. A dust guard as claimed in claim 1, said cap being provided with an outward bulge thereon and coacting with said cap to provide a lubricant reservoir of a size sufficient to maintain said lubricant applying means in supersaturated condition.

3. A dust guard as claimed in claim 1, and wherein said caps are mounted on alternate ones of said links forming said chain and said cavities surrounding the outer portions of said links with respect to the sprocket engaging portions thereof.

4. A dust guard for power transmission chains having a plurality of interconnected links comprising a continuous channel-shaped resilient cover entrained over the outer sides of said links, portions of said cover being substantially thicker than intermediate portions, said thicker portions covering alternate ones of said links, and said intermediate portions covering the connecting links and being substantially more flexible than said thicker portions whereby said chain can flex about coacting sprockets.

5. A dust guard as claimed in claim 4, the depending legs on said channel-shaped cover being biassed inwardly in unmounted relationship and having means therein for coaction with link portions to secure said cover on said chain.

6. A dust guard as claimed in claim 4, said thicker portions having longitudinal depending ends forming with the depending legs of said channel-shaped cover lubricant reservoirs, and lubricant retaining means mounted in said reservoir.

7. A dust guard for power transmission chains having a plurality of interconnected links comprising a continuous resilient channel-shaped cover entrained over the outer sides of said links, link lubricating means confined within said cover and in direct lubricating contact with alternate ones of said links, clips mounted externally over said cover on said links having said lubricating means in contact therewith securing said cover and means on said links and said chain, and outwardly directed corrugations in said cover intermediate said clips permitting flexing of said chain about coacting sprockets in the absence of high fatigue stresses in said cover.

8. A dust guard for power transmission chains having a plurality of interconnected links comprising a cap shaped member adapted for mounting on a said link and presenting a partial link surrounding cavity to one side of said link, means for securing said cap shaped member in link surrounding position, link lubricant applying means mounted in said cavity and maintained in lubricating contact with said link, lubricant shield members mounted on alternate ones of said links intermediate of said covered links and adapted to prevent loss of lubricant due to centrifugal forces on movement of said chain.

9. A dust guard as claimed in claim 8, said shields being secured to said links and having the longitudinal ends thereof extending under the edges of contiguous caps to form a substantially continuous dust guard and lubricator for the outer side of the chain.

10. A dust guard for power transmission chains having a plurality of interconnected links comprising a continuous resilient channel-shaped cover entrained over the outer sides of said links, link lubricating means confined within said cover and being in direct lubricating contact with alternate ones of said links, and outwardly directed corrugations in said cover intermediate said links in lubricating contact with said link lubricating means for permitting flexing of said chain about coacting sprockets in the absence of high fatigue stresses in said cover.

References Cited in the file of this patent

UNITED STATES PATENTS

| 447,813 | Elliott | Mar. 10, 1891 |
| 1,007,569 | Holsman | Oct. 31, 1911 |
| 1,998,682 | McCann | Apr. 23, 1935 |

FOREIGN PATENTS

| 617,909 | Great Britain | Feb. 14, 1949 |
| 1,018,248 | France | Oct. 8, 1952 |